Oct. 13, 1942.  J. WINLOCK ET AL  2,298,633
ELECTRODE DRESSING TOOL
Filed June 25, 1940
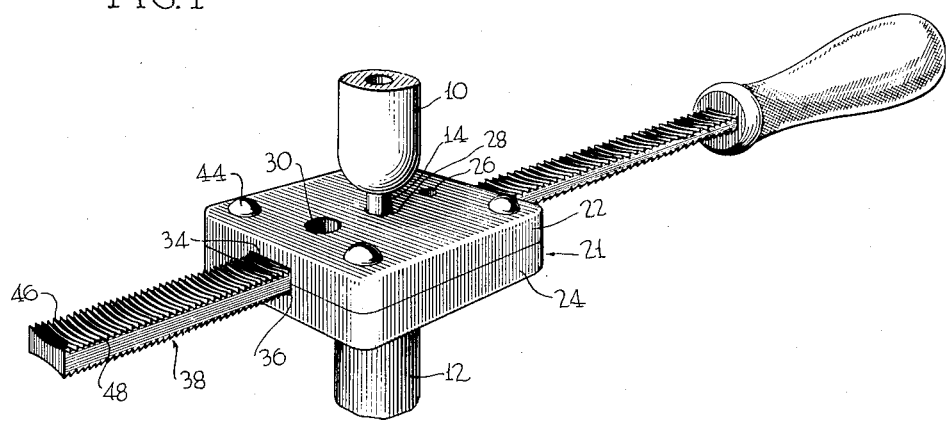
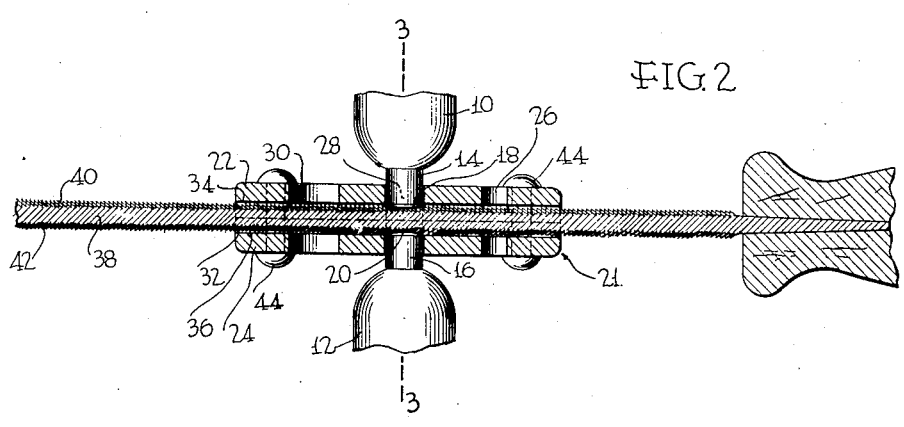
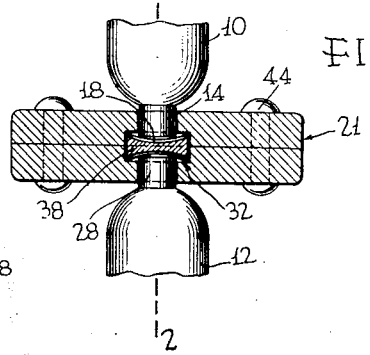
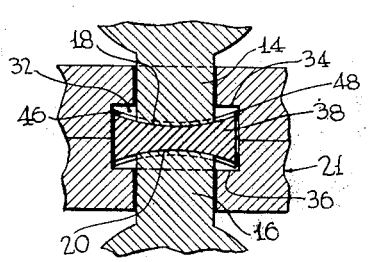
INVENTOR
Joseph Winlock.
John J. MacKinney
BY John V. Tarbox
ATTORNEY Patented Oct. 13, 1942

2,298,633

UNITED STATES PATENT OFFICE 2,298,633

ELECTRODE DRESSING TOOL

Joseph Winlock and John J. MacKinney, Philadelphia, Pa., assignors to Edward G. Budd Manufacturing Company, Philadelphia, Pa., a corporation of Pennsylvania Application June 25, 1940, Serial No. 342,234

5 Claims. (Cl. 29—76)

This invention relates to welding electrode dressing tools and more particularly to a tool adapted to shape the tip surfaces of opposed substantially axially aligned welding electrodes.

In electric resistance welding, in order that assurance may be had that all welds produced have the required strength, it is essential that certain conditions be maintained substantially constant, for example, the pressure applied between the welding electrodes, the welding current strength, the time of flow of welding current, the surface of the material undergoing welding and the surface of the welding tip which somewhat directly affects the area of the weld. The present invention is directed toward this latter feature, namely the dressing of welding electrode tips such that consistent welding may be obtained where other conditions are maintained substantially constant. As a result of considerable experimentation, it has been discovered that in resistance welding the use of a substantially spherical electrode tip is preferable where conditions permit and that the radius of such tip should vary within the limits of an inch to two and one-half inches, in practice it generally being preferable to employ a radius of an inch and a half to two inches. One of the reasons why a spherical electrode tip of the radius suggested is preferable is to some extent dependent upon the fact that in the usual welding equipment the support for the opposed electrodes is offset from the axis of the electrodes in such a manner that when welding pressure is applied a certain amount of yielding occurs which tends to throw the welding electrodes slightly out of alignment.

To provide a dressing tool which may readily effect the desired tip contour and which may be employed with a minimum of effort and time so that the average weld operator would not object to its use has been one of the difficulties in the art.

Accordingly, it is an object of the present invention to provide an electrode tip dressing tool which is simple in construction and which is operable to dress electrode tips spherically with a minimum of time and effort.

Another object of the invention is to provide a jig adapted to cooperate with opposed aligned electrodes and which jig is adapted to guide a concave cylindrically faced abrading tool which, when reciprocated at various angles in a plane lying transverse to the axis of the welding electrodes, will quickly effect a spherical tip face upon the welding electrodes.

The above and other novel features of the invention will appear more fully hereinafter from the following detailed description when taken in conjunction with the accompanying drawing. It is expressly understood, however, that the drawing is employed for purposes of illustration only and is not designed as a definition upon the limits of the invention, reference being had for this purpose to the appended claims.

Referring to the drawing wherein like reference characters indicate like parts,

Figure 1 is a perspective view of the jig and abrading tool arranged in operative relation with a pair of substantially axially aligned electrodes.

Figure 2 is a longitudinal section through the jig and abrading tool of Figure 1.

Figure 3 is a section taken on the line 3—3 of Figure 2 and

Figure 4 is an enlarged section of a portion of Figure 3 likewise taken substantially on the line 3—3 of Figure 2.

Referring to the drawing, in Figures 1 through 3 there is illustrated a pair of substantially aligned welding electrodes 10 and 12 having reduced diameter tip end portions 14 and 16, which end portions for satisfactory welding preferably have spherical tips 18 and 20 of a radius ranging substantially from an inch to two and one-half inches depending upon the material to be welded and its thickness.

In order to easily provide such a spherical tip upon the end of the electrodes a guide jig 21 composed of top and bottom plates 22 and 24 is provided in which are arranged transverse apertures 26, 28 and 30, the apertures varying in size in order to receive various diametered end tips. Transversely to the apertures 26, 28 and 30 and in alignment therewith is arranged a rectangular slot 32 formed by grooves 34 and 36 arranged in the abutting faces of the top and bottom plates 22 and 24 of the guide jig 21. Reciprocably received in the slot 32 is an abrading tool in the form of a file 38 having concave cylindrical surfaces 40 and 42, these cylindrical surfaces having a radius corresponding to the radius of the spherical surfaces which it is desired to apply to the tips 18 and 20.

To abrade the tips of the electrodes so as to effect the spherical surface desired, it will appear that all that it is necessary to do is to insert the electrode tip ends through one of the apertures 26, 28 or 30 of the guide jig 21 and thereafter reciprocate the file or abrading tool 38 while applying suitable pressure between the electrodes. By reciprocating the file in a plane transverse to the axis of the electrode tips and changing the angular direction of the reciprocatory motion gradually through an angle of 90° or more a spherical surface is generated upon the tips 18 and 20 of the electrodes.

In practice, in order to prevent wear upon the guide jig 21, the members thereof may be made of hardened steel securely fastened together by rivets 44 as shown or the teeth of the file at their edges 46 and 48 may be sufficiently dulled so as to have little or no cutting effect upon the guide jig, it being merely necessary that the file have a cutting width equal to that of the largest aperture 30 illustrated.

In using the dressing tool it is obviously preferable that the electrode receiving aperture 26, 28 or 30 employed fit the electrode tip end fairly snugly as is illustrated in Figure 4, thus assuring that the guide jig 21 will be caused to guide the file in a plane substantially transverse to the axis of the welding electrodes and also so that true spheres will be formed. It will be appreciated also that in the dressing of electrodes the pressure exerted by the electrodes upon the file should be gradually lightened as the dressing proceeds so that the final abrading movement will leave a spherical surface rather than a convex cylindrical surface for, if the final stroke of the abrading tool is allowed to make a severe cut upon the electrodes, a convex cylindrical electrode tip will result despite such previous shaping which may have been effected. This gradual lightening of the pressure during dressing operation, however, is a natural procedure where the facing of tools and the like is being undertaken and does not in any way prevent the use of the dressing tool by other than skilled operators.

Through the dressing of the welding electrodes to a proper spherical diameter particularly in the welding of thin stainless steel sheets, it has been found that ten times as many welds may be effected between electrode dressing and consistent welds obtained. The application of spherical tips to electrodes in the welding of heavier sheet material has also been found to be instrumental in increasing the number of welds that can be made consistently between dressing as well as resulting in a great saving of the relatively expensive alloy material such as Mallory metal of which the electrodes are made. Thus through the occasional use of the dressing tool herein disclosed, not only are the periods between dressing greatly increased but also the quality of the welds is improved and considerable saving effected in welding electrode material. In addition, the welds effected by tips properly shaped have a much better finished appearance.

Though a single embodiment of the invention has been illustrated and described, it is to be understood that the same is not limited thereto but may be embodied in various other equivalent mechanical arrangements. For example, it is not essential that the tool abrade both electrode tips simultaneously for obviously a jig may be constructed to receive one of the welding tips in a spaced relation from the abrading tool while permitting the other tip to engage the tool. This would occur if the welding electrode tip portions were of different diameter so that one electrode would have a diameter greater than the guide hole of the correct diameter and in alignment with the other electrode. As such changes in the construction and arrangement of the parts may be made without departing from the spirit of the invention, as will be apparent to those skilled in the art, reference will be had to the appended claims for a definition of the limits of the invention.

What is claimed is:

1. In a dressing tool for welding electrodes, a guide jig having an aperture extending therethru for the reception of opposed substantially axially aligned welding electrode tips, and a second aperture extending therethru transverse to said first aperture and intersecting said first aperture, and an abrading tool adapted to be reciprocated in said second aperture, said tool having arcuate concave longitudinally extending abrading faces adapted to suitably shape the end tips of welding electrodes inserted into said first-named aperture into engagement with the tool during reciprocation of said tool in its aperture, whereby a spherical face may be cut upon the electrode tip by reciprocating said tool at various angles in a plane transverse to the axis of the electrodes.

2. In a dressing tool for a welding electrode, a guide jig having an aperture extending thereinto for the reception of a welding electrode, a second aperture extending thru said jig transverse to said first-named aperture and intersecting said first-named aperture, and an abrading tool having an arcuate concave longitudinally extending abrading surface reciprocable in said second aperture and adapted to contact an electrode tip inserted into the first-named aperture to shape the tip surface thereof, whereby a spherical face may be cut upon the electrode tip by reciprocating said tool at various angles in a plane transverse to the axis of the electrodes.

3. A welding electrode dressing jig comprising means for swivelly receiving an electrode tip, and means substantially transverse thereto for guiding an abrading tool transversely to the axis of and across the tip of an electrode inserted in said first-named means, and an abrading tool having a substantially arcuate concave longitudinally extending abrading face adapted to be reciprocated in said guiding means with said abrading face against the tend of a tip of said electrode.

4. The method of dressing a pair of opposed substantially coaxial welding electrode tips to provide substantially spherical end faces thereon which comprises reciprocating an abrading tool having opposed concave cylindrical faces against the tips of said electrodes and under pressure in a plurality of directions in a plane substantially transverse to the electrode axis.

5. The method of dressing a pair of opposed substantially coaxial welding electrode tips to provide substantially spherical end faces thereon which comprises reciprocating an abrading tool having opposed concave cylindrical faces against the tips of said electrodes and under pressure in a plurality of directions in a plane substantially transverse to the electrode axis, and gradually diminishing the pressure as the tips become spherical.

JOSEPH WINLOCK.
JOHN J. MacKINNEY.